(12) United States Patent
Weiss

(10) Patent No.: US 7,422,254 B2
(45) Date of Patent: Sep. 9, 2008

(54) BAIT APPLICATOR

(76) Inventor: Stuart Weiss, 8 Burling Ave., White Plains, NY (US) 10605

( * ) Notice: Subject to any disclaimer, the term of this patent is extended or adjusted under 35 U.S.C. 154(b) by 1257 days.

(21) Appl. No.: 10/345,930

(22) Filed: Jan. 17, 2003

(65) Prior Publication Data

US 2004/0140680 A1    Jul. 22, 2004

(51) Int. Cl.
  *B25J 1/00* (2006.01)
  *A01M 25/00* (2006.01)
(52) U.S. Cl. ........................ 294/19.1; 43/131
(58) Field of Classification Search ............... 294/19.1, 294/19.3, 9, 11, 14, 23, 23.5, 61; 43/131, 43/126, 124, 140, 6, 57.1
See application file for complete search history.

(56) References Cited

U.S. PATENT DOCUMENTS

| | | | |
|---|---|---|---|
| 757,401 A | 4/1904 | Harlan | |
| 1,052,376 A | 2/1913 | Payne | |
| 2,891,811 A * | 6/1959 | Strickler | 294/19.1 |
| 3,774,556 A | 11/1973 | Poll | |
| 3,940,870 A * | 3/1976 | Pettersen | 43/44.2 |
| 4,776,361 A * | 10/1988 | Staton | 135/65 |
| 4,889,375 A * | 12/1989 | Leu | 294/10 |
| 4,904,010 A | 2/1990 | Lacey et al. | |
| 5,823,592 A | 10/1998 | Kalidindi | |
| 6,065,787 A | 5/2000 | Jarosch | |
| 6,145,602 A * | 11/2000 | Kutinsky | 175/107 |
| 6,223,465 B1 * | 5/2001 | Soller et al. | 43/131 |
| 6,397,516 B1 | 6/2002 | Su | |
| 6,397,517 B1 * | 6/2002 | Leyerle et al. | 43/131 |
| 6,705,654 B2 * | 3/2004 | Slauf | 294/24 |
| 6,729,067 B2 * | 5/2004 | Lund et al. | 43/131 |

* cited by examiner

*Primary Examiner*—Dean J Kramer

(57) ABSTRACT

A variable length bait applicator allows bait to be placed or held in remote locations. Rods are attached to one another to attain a desired length by inserting a securing extension in a rod first end into an open second end in a second rod. A bait holder is secured to the rod(s) by inserting a rod securing extension into an access opening in the bait holder first end. The bait holder is provided with a splined pin or shaft extension having protrusions and retainers on a second end. An access opening in the bait holder allows a snap lock on the securing extension that is secured over a locking protrusion on the bait holder to be disengaged.

20 Claims, 3 Drawing Sheets

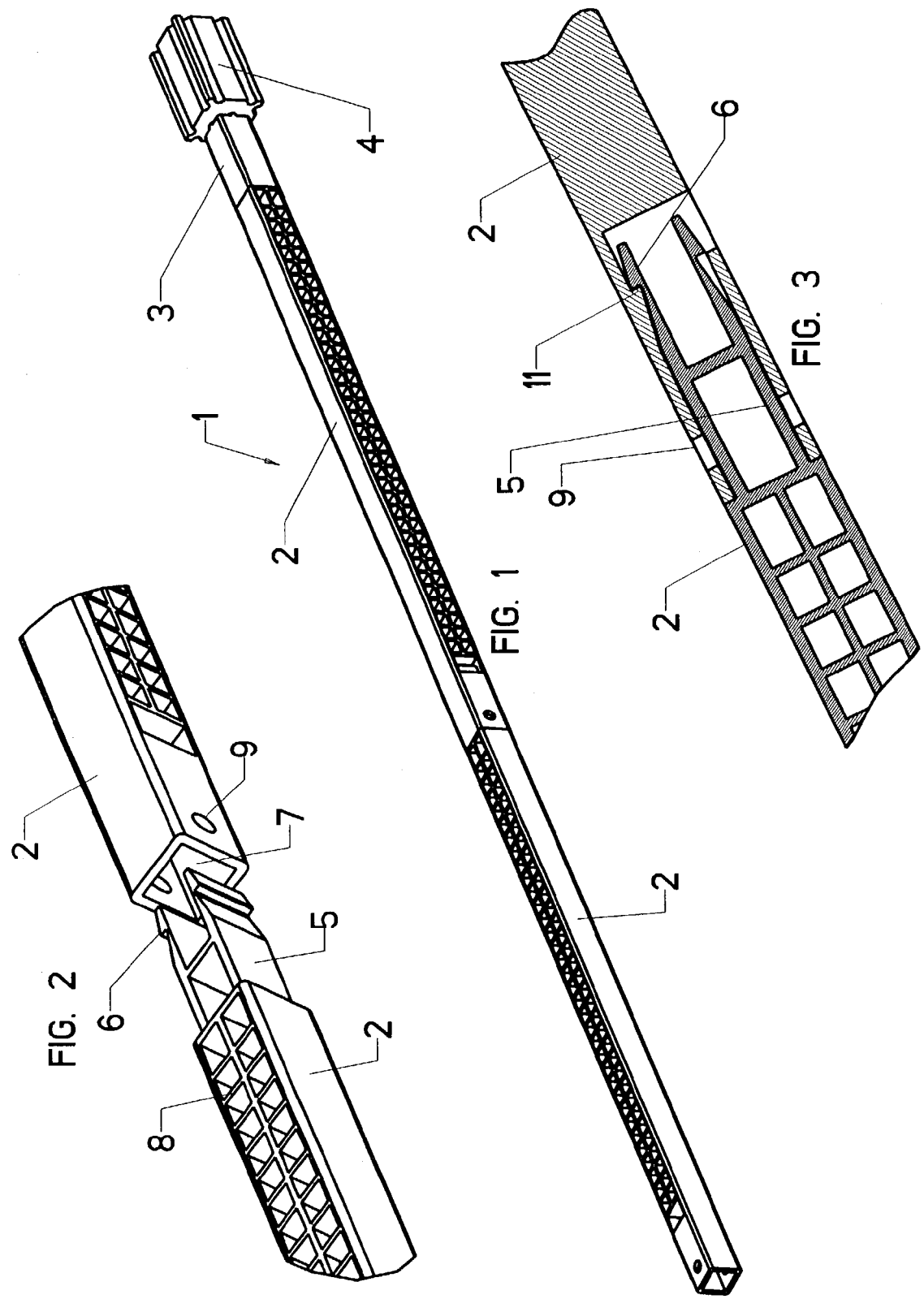

BAIT APPLICATOR

BACKGROUND OF THE INVENTION

1. Field of the Invention

A variable length bait applicator positions a bait holder in remote locations where it can be monitored or removed at will.

2. Description of Related Art

It is a common practice to toss bait under cabinets, in crawl spaces, attics, in wall voids, etc. without checking on or removing the bait. Such disposal of bait can lead to infestations such as grain insects, fabric pests, and numerous other parasitic insects as well as the possible poisoning of non-target animals and children. The removal and extermination of pests by traps and poisons for rodents, termites, etc. is old and common. N. Su, U.S. Pat. No. 6,397,516, issued 4 Jun. 2002 and R. Legerle et al, U.S. Pat. No. 6,397,517, issued 4 Jun. 2002, are examples of subterranean bait emplantment and bait traps respectively. M. Harlan, U.S. Pat. No. 757,401, issued 12 Apr. 1904, teaches inserting a trap into an animal hole. J. Payne, U.S. Pat. No. 1,052,376, issued 4 Feb. 1913, teaches a flexible metal bar used to place combustible materials down holes to exterminate pests. E. Poll, U.S. Pat. No. 3,774,556, issued 27 Nov. 1973, teaches extendable pipes attached to a drill for introducing a toxic liquid below ground level to exterminate termites. Extendable gripping means are common with D. Kutinsky, U.S. Pat. No. 6,145,602, issued 14 Nov. 2000, and S. R. Kalidindi, U.S. Pat. No. 5,823,592, issued 20 Oct. 1998, and R. Jarosch, U.S. Pat. No. 6,065,787, issued 23 May 2000, examples.

SUMMARY OF THE INVENTION

A bait holder or hanger has an extension on one end that secures bait, having a hole in it, to the bait holder. The bait holder is attached to a rod used to insert and remove bait in hard to reach areas and inaccessible voids, such as attics, crawl spaces, and drop ceilings. The device allows the material or bait to be monitored, replaced and removed as necessary or desireable. The rod(s) and bait holder can be permanently or removably secured to each other using snap locks and matching locking protrusions. Using rods attached end to end a long reach can be attained by inserting securing extensions on one rod first end into an open rod second end of a second and subsequent rods.

BRIEF DESCRIPTION OF THE DRAWINGS

FIG. 1 is a perspective view of a bait applicator.

FIG. 2 is an exploded perspective partial view of rod end connectors of the bait applicator.

FIG. 3 is a partial sectional side view of rod ends connected together.

DESCRIPTION OF THE PREFERRED EMBODIMENTS

Figure 4:
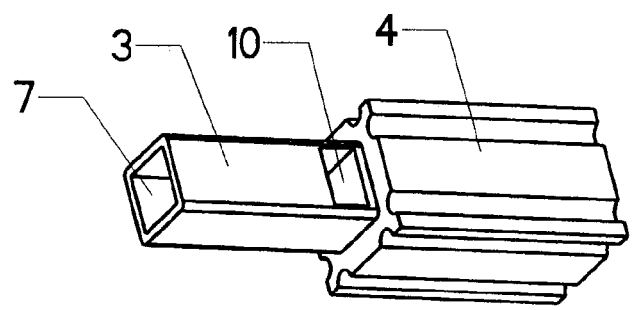
FIG. 4 is a perspective view of a first bait holder with bait attached.

FIG. 1 is a perspective view of the bait applicator 1 consisting of two rods 2 joined together with a bait holder 3 secured to a bait 4.

FIG. 2 is an exploded perspective view of two rods end connectors. The rods 2 are molded 8 elongated extensions. One first end has a securing extension 5 with resilient snap locks that extend outwardly. The second end has an open end 7 that the securing extension and resilient snap lock fit into. A securing hole 9 is provided that can be used to attach the rods to a structure such as a cabinet, pipe, wall, floor or other object to secure it in position so that it cannot be removed accidentally or by a pet or child during treatment.

FIG. 3 is a sectional side view of rod ends secured together. The securing extension 5 of the first rod is inserted all the way into the open end of the second rod. The second rod has a locking protrusion 11 over which the protrusions 6 of the snap lock fit to permanently secure the two rods together.

FIG. 4 is a perspective view of a first bait holder 3 with a bait 4 attached to it. The bait holder has an outside perimeter essentially the same as the outside perimeter of the rods 2. The first end of the bait holder has a rod access opening 7, the same as the open second end of a rod 2, for securing it to a first rod end securing extension 5. An elongated bait holder access opening 10 provides access to the interior of the bait holder.

Figure 5:
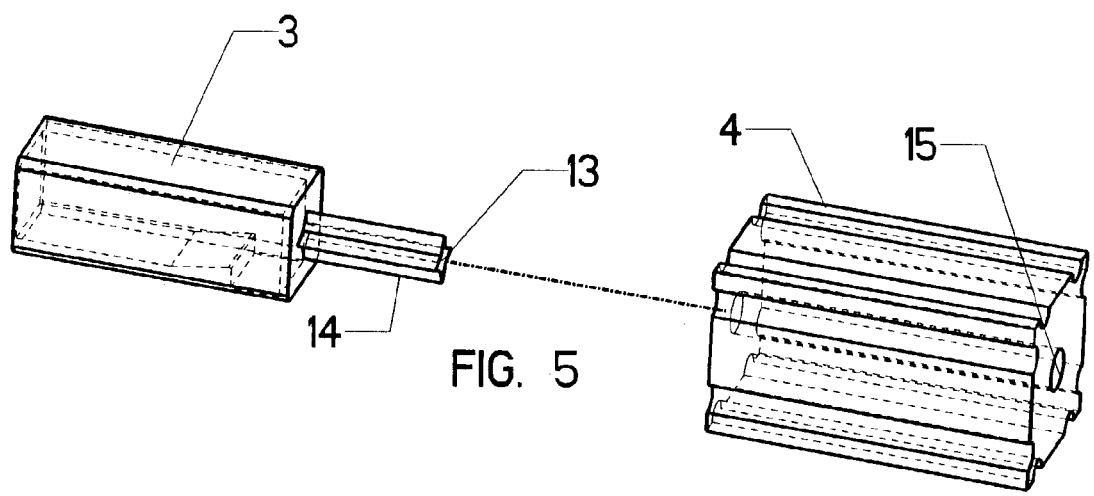
FIG. 5 is an exploded perspective view of the bait holder of FIG. 4 and bait.

FIG. 5 is an exploded perspective view of the bait holder. The second end of the bait holder has integral therewith or attached thereto a pin 13 that is provided with protrusions such as splines that extend outwardly therefrom. The bait 4 has a bait hole 15 extending therethrough. The bait hole 15 preferably has a diameter that is smaller than the protrusions 14 of the pin 13. The bait is pressed onto the protrusions of the pin to secure the bait on the bait holder.

Figure 6:
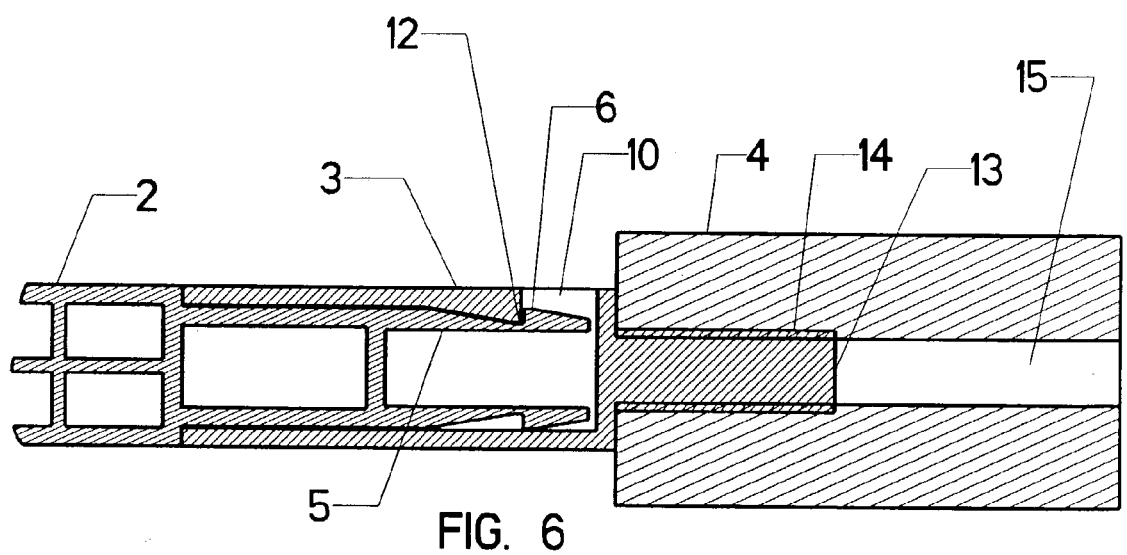
FIG. 6 is a partial sectional side view of the bait holder and bait of FIG. 4 connected to a rod.

FIG. 6 is a sectional side view of the bait holder 3 and bait 4 secured to one end of a rod 2. The bait holder has a locking protrusion 12 that extends into the rod access opening. The snap lock 6 of the securing extension 5 snaps over the locking protrusion 12 to secure the bait holder to the rod 2. Unlike the locking shown between the snap lock 6 and locking protrusion 11 of FIG. 3, the holder access opening 10 provides access to the snap lock 6. Since the bait holder lower side has no locking protrusion, only the upper snap lock 6 secures the bait holder 3 onto the rod 2. By using the bait holder access opening to press on the top snap lock 6, the snap lock 6 can be forced inwardly and beyond the locking protrusion 12. In this position, the bait holder 3 can be pulled away from the rod. This makes the rod and/or bait holder reusable with other rods and/or bait holders. The bait holder 3 can be designed to be permanently connected to a rod 2 as shown in FIG. 3.

Figure 7:
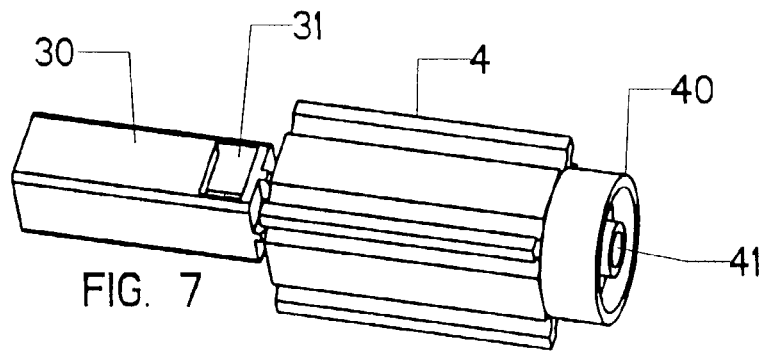
FIG. 7. Is a perspective view of a second bait holder with bait attached using a retainer.

FIG. 7 is a perspective view of a second bait holder 30 with bait 4 attached. The bait holder 30 has an access opening 31 with a retainer 40 having an outer opening 41.

Figure 8:
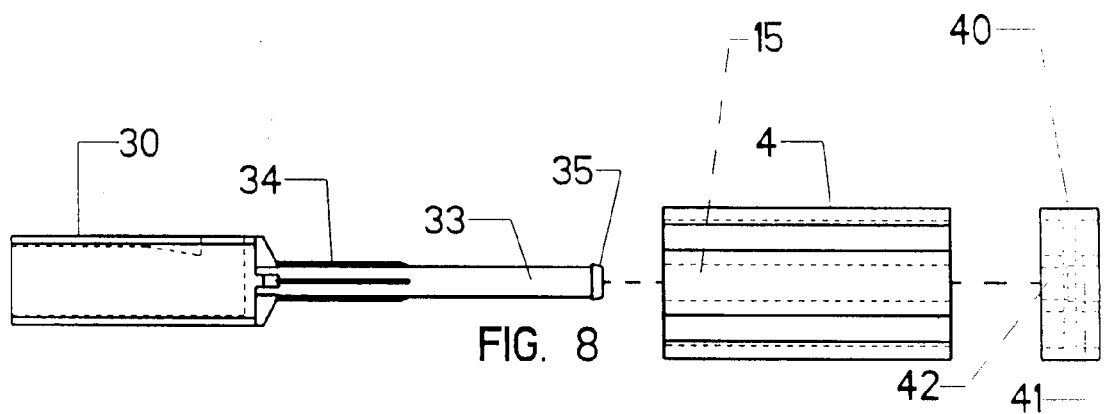
FIG. 8 is an exploded side view of the bait holder, retainer and bait of FIG. 7.
Figure 9:
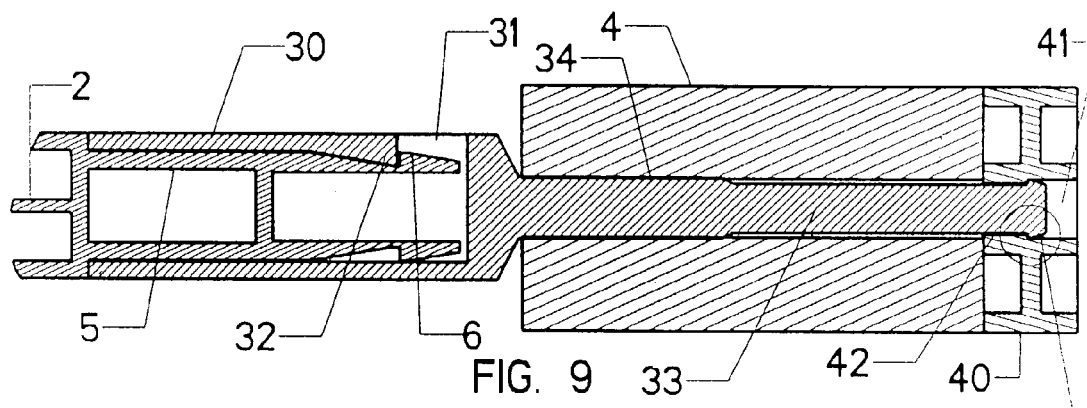
FIG. 9 is a partial sectional side view of the bait applicator showing the bait holder and bait of FIG. 7.
Figure 10:
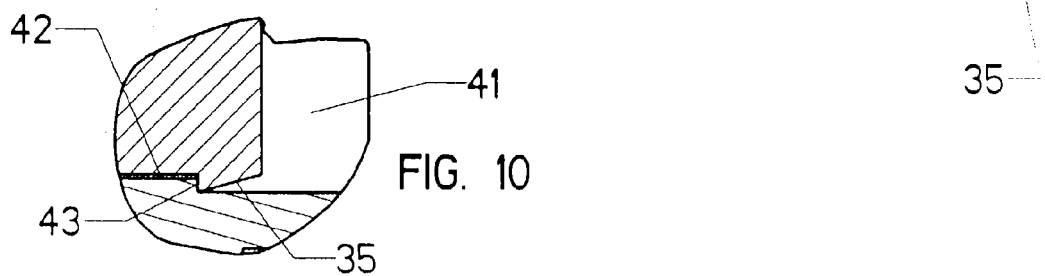
FIG. 10 is an enlarged showing of the retainer connection of FIG. 9.

FIG. 8 is an exploded side view of the bait holder of FIG. 7. FIG. 9 is a partial sectional side view of the bait holder of FIG. 8 on a rod. The bait holder 30 second end is provided with a shaft extension 33 that extends further than the bait hole 15. Short protrusions 34 extend outwardly from the shaft extension 33. The protrusions 34 on the extension have an outward extent that is preferably but not necessarily greater than the diameter of the bait hole 15. Pressing the extension 33 into the bait 4 results in the protrusions tightly holding the bait in position. The shaft extension outer end is provided with a locking knob 35 that has a diameter greater than that of the shaft extension 33. The retainer 40 has a central outer opening 41, that has a diameter that is essentially the same as that of the locking knob 35, and a central inner opening 42, that has a diameter that is smaller than the diameter of the locking knob 35. The different diameters form a retainer lip 43, shown within a circle in FIG. 9, and shown enlarged in FIG. 10. By pressing the retainer 40 over the extension locking knob 35, the locking knob is forced through the inner opening 42 and into the outer opening 41. When the locking knob 35 is passed through the inner opening 42 it expands into the outer opening 41 and presses against the retainer lip 43 to lock the retainer 40 and bait 4 onto the bait holder 30. As with the bait holder 3 access opening 10, the access opening 31 permits the rod 2 snap lock 6 to be removably secured to the bait holder 30. As with the locking protrusion 12 of the first bait holder 3, a locking protrusion 32 secures the snap lock 6 to the rod 2 adjacent to access opening 31.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

The invention claimed is:

1. A bait applicator for positioning bait in hard to reach locations comprising:
   an elongated rod and a bait holder;
   said bait holder having a first end and a second end;
   said elongated rod having a first end and a second end;
   a means for securing bait onto said bait holder second end and a means for securing said bait holder first end to said elongated rod;
   said elongated rod second end having a means for securing said bait holder first end thereto;
   means for locking said bait holder first end to said elongated rod second end to preclude unwanted separation;
   said means for securing bait onto said bait holder second end is a bait entering extension on said bait holder second end;
   a bait securing means on said bait entering extension.

2. A bait applicator as in claim 1 wherein:
   said means for securing said bait holder first end to said elongated rod includes snap locks that extend out from said elongated rod second end;
   an open end is provided in said bait holder first end;
   said elongated rod snap locks fit within said open end in said bait holder first end.

3. A bait applicator as in claim 2 wherein:
   said bait holder is provided with a locking protrusion;
   said bait holder locking protrusion and said elongated rod snap locks engage to secure said bait holder and said rod together.

4. A bait applicator as in claim 3 wherein:
   said bait holder locking protrusion is positioned adjacent to a bait holder access opening such that pressing on said elongated rod snap locks through said access opening releases said elongated rod snap locks from said bait holder locking protrusions so that said elongated rod and said bait holder can be separated.

5. A bait applicator as in claim 3 wherein:
   an elongated rod access opening is positioned on said bait holder first end;
   said bait holder locking protrusion is positioned away from said elongated rod access opening so that the engagement of said bait holder locking protrusion and said elongated rod snap locks provides a permanent securement.

6. A bait applicator for positioning bait in hard to reach locations as in claim 1 wherein:
   said bait entering extension is a pin;
   said bait entering extension pin bait securing means is protrusions extending along said bait entering extension pin for securing bait thereto.

7. A bait applicator as in claim 6 wherein:
   a bait is attached to said bait holder bait entering extension pin;
   said bait on said bait holder bait entering extension pin has a hole therethrough;
   said hole through said bait has a diameter that is smaller than the diameter of said protrusions on said bait holder bait entering extension pin.

8. A bait applicator for positioning bait in hard to reach locations as in claim 1 wherein:
   said bait entering extension is a shaft extension that extends through bait;
   said shaft extension bait securing means has short protrusions along said bait entering extension to secure bait thereto.

9. A bait applicator as in claim 8 wherein:
   said shaft extension has a lock knob on its end with a radial diameter that is larger than said shaft extension diameter.

10. A bait applicator as in claim 9 including:
    a retainer;
    said retainer having an inner opening and an outer opening therethrough;
    said shaft extension lock knob fits through said retainer inner opening and into said outer opening to secure said retainer on said bait holder.

11. A bait applicator as in claim 10 wherein:
    said retainer inner opening has a smaller diameter than said retainer outer opening;
    said shaft extension lock knob has a diameter that is larger than said retainer inner opening but that is not larger than said retainer outer opening.

12. A bait applicator as in claim 10 wherein:
    said retainer inner opening and said retainer outer opening are concentric and join to form a retainer lip adjacent their adjoining area;
    said shaft extension lock knob engages said retainer lip to secure said retainer onto said bait holder.

13. A bait applicator for positioning bait in hard to reach locations comprising:
    an elongated rod and a bait holder;
    said bait holder having a first end and a second end;
    said elongated rod having a first end and a second end;
    a means for securing bait onto said bait holder second end and a means for securing said bait holder first end to said elongated rod;
    said elongated rod second end having a means for securing said bait holder first end thereto;
    means for locking said bait holder first end to said elongated rod second end to preclude unwanted separation;
    said elongated rod is composed of elongated extensions;
    each elongated extension has a first end and a second end;
    each elongated extension second end has a securing extension thereon;

each elongated extension first end has an open end for linear sliding reception of said elongated extension securing extension;
a first elongated extension second end securing extension slide fits within a first elongated extension open end to secure elongated extensions together.

14. A bait applicator for positioning bait in hard to reach locations as in claim 13 includes:
a snap lock on said elongated securing extensions' second ends for locking said elongated extensions' second ends securing extensions within said elongated extensions' first open ends to preclude inadvertent separation of said elongated extensions.

15. A bait applicator for positioning bait in hard to reach locations as in claim 14 wherein:
an access opening is positioned adjacent to said elongated rod elongated extension first open end for access to said snap lock on said elongated securing extension second end.

16. A bait applicator as in claim 13 wherein:
said elongated rod elongated extension first end is provided with a securing hole so that said rod can be attached to an adjacent structure to prevent accidental removal.

17. A bait applicator as in claim 13 wherein:
said means for securing bait onto said bait holder second end is a bait entering extension pin on said bait holder second end for extending into bait;
said bait entering extension pin for extending into bait has splines extending therealong for secure bait attachment.

18. A bait applicator as in claim 13 wherein:
said means for securing said bait holder first end to said elongated rod second end includes an elongated extension with snap locks on said elongated rod second end;
said bait holder first end has an open end;
said elongated rod elongated extension securing snap locks extend within said bait holder first end open end;
said bait holder is provided with a locking protrusion;
said bait holder locking protrusion and said elongated rod elongated extension snap locks engage to secure said bait holder and said elongated rod elongated extension together.

19. A bait applicator as in claim 18 wherein:
said elongated rod elongated extension first end is provided with a securing hole so that said rod can be attached to an object to prevent unintended removal.

20. A bait applicator as in claim 13 wherein:
said means for securing said bait onto said bait holder is a shaft extension for extending into bait
said bait extension is provided with short protrusions to secure bait thereto;
a bait is attached to said bait holder shaft extension;
said bait on said shaft extension has a hole therethrough;
said hole through said bait has a diameter that is larger than the diameter of said shaft extension and smaller than the diameter of said short protrusions on said shaft extension.

* * * * *